Patented Feb. 7, 1928.

1,658,519

UNITED STATES PATENT OFFICE.

WALENTY DOMINIK, OF WARSAW, POLAND.

PROCESS FOR THE PREPARATION OF NITRATES AND A DRY MIXTURE OF CHLORINE AND NITROSYL CHLORIDE.

No Drawing. Application filed March 13, 1926, Serial No. 94,576, and in Poland March 11, 1925.

The preparation of nitrates from chlorides and synthetic nitric acid is very advantageous if free chlorine can be obtained at the same time. In many cases a dry mixture of chlorine and nithosylchloride is also capable of practical application. In the first place chlorine may be separated in a pure state from such a mixture by known methods. Apart from this, however, the mixture of chlorine and nitrosylchloride can be used for certain technical purposes without separation of the constituents. For instance a mixture of this kind acts in many cases as a chlorinating agent similarly to pure chlorine and the NO remains and can be reconverted into $HNO_3$. The following reactions will serve as examples of such applications of the said mixture.

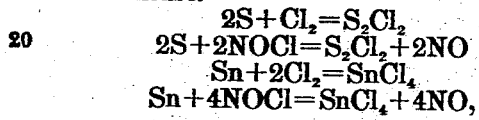

Besides this, however, a number of other reactions may be effected by means of the mixture. Now the process according to the present invention renders it possible to produce a dry mixture of chlorine and nitrosyl chloride as well as the nitrate concerned from technical aqueous nitric acid solution and metallic chlorides.

I have found that for this purpose the conversion must take place in the presence of a large excess of nitric acid, so that after the conversion has been completed the nitric acid in the solution is still present in seven times normal (7n) concentration, which renders possible an almost complete conversion into the nitrate, whilst at the same time allowing the vapour pressure to be kept low, in spite of the relatively high temperature. By cooling down the gases arising from the reaction to ordinary atmospheric temperature by means of a dephlegmation column, a pure mixture of chlorine and nitrosyl chloride is finally obtained, which is almost entirely free from water and nitric acid.

After the chlorine has been removed in this manner from the reaction mixture and either after or before the separation of the saltpetre or other metallic nitrate a portion of the water may be driven off from the residual solution by heating and dephlegmation and thus the acid may be concentrated to such an extent that it may be used to decompose fresh quantities of chloride in precisely the same way as before. In view of the high solubility of the saltpetre it is advantageous, in order to avoid unnecessary heat losses, not to crystallize out the saltpetre each time after the chlorine has been driven off, but only to do this from time to time when the degree of concentration has become suitably increased.

The following is an example of one preferred method of carrying out the process:

100 ccm. of 11.5 normal nitric acid are heated with 16 gr. potassium chloride under a reflux condenser. As soon as the temperature of the reaction mixture has risen to 105° C. and about 90% of the chlorine continued in it has evaporated off as chlorine and nitrosyl chloride, the mixture is more strongly heated and about 16 gr. of water are distilled off with the use of a dephlegmator. The residual solution may be again heated with a further quantity of 12 gr. of potassium chloride and again an almost complete evaporation of the chlorine will be obtained at 105° C.

I claim:

1. Process for the preparation of nitrates and of a dry mixture of chlorine and nitrosyl chloride from metallic chlorides and aqueous nitric acid, consisting in treating said metallic chlorides under heat with aqueous nitric acid containing more than 440 gr. of $HNO_3$ per litre, said aqueous nitric acid being in such excess as to be still of at least 7 times normal strength after the reaction, separating the chlorine and nitrosyl chloride forming the gaseous products of the reaction by means of a dephlegmation column, crystallizing out the nitrates from the mother liquor of the reaction and using the said mother liquor with the addition of a further quantity of metallic chloride for the repetition of the process.

2. Process for the preparation of nitrates and of a dry mixture of chlorine and nitrosyl chloride from metallic chlorides and aqueous nitric acid solution, consisting in heating 100 ccm. of nitric acid of 11.5 times normal strength with 16 gr. potassium chloride under a reflux condenser, then, after the temperature of the reaction mixture has risen to 105° C. and about 90% of the chlorine originally contained in said mixture has evaporated off as chlorine and nitrosyl chloride, heating more strongly, distilling off with the use of a dephalegmator about 16 gr. of water and again heating the residual solution with further 12 gr. of potassium chloride for the repetition of the process.

In testimony whereof I have hereunto set my hand.

Dr. WALENTY DOMINIK.